(No Model.) 4 Sheets—Sheet 1.

L. T. PATES.
CONVERTIBLE BICYCLE.

No. 582,678. Patented May 18, 1897.

Witnesses:

Lewis T. Pates.
Inventor
By Geo. H. Evans
Attys.

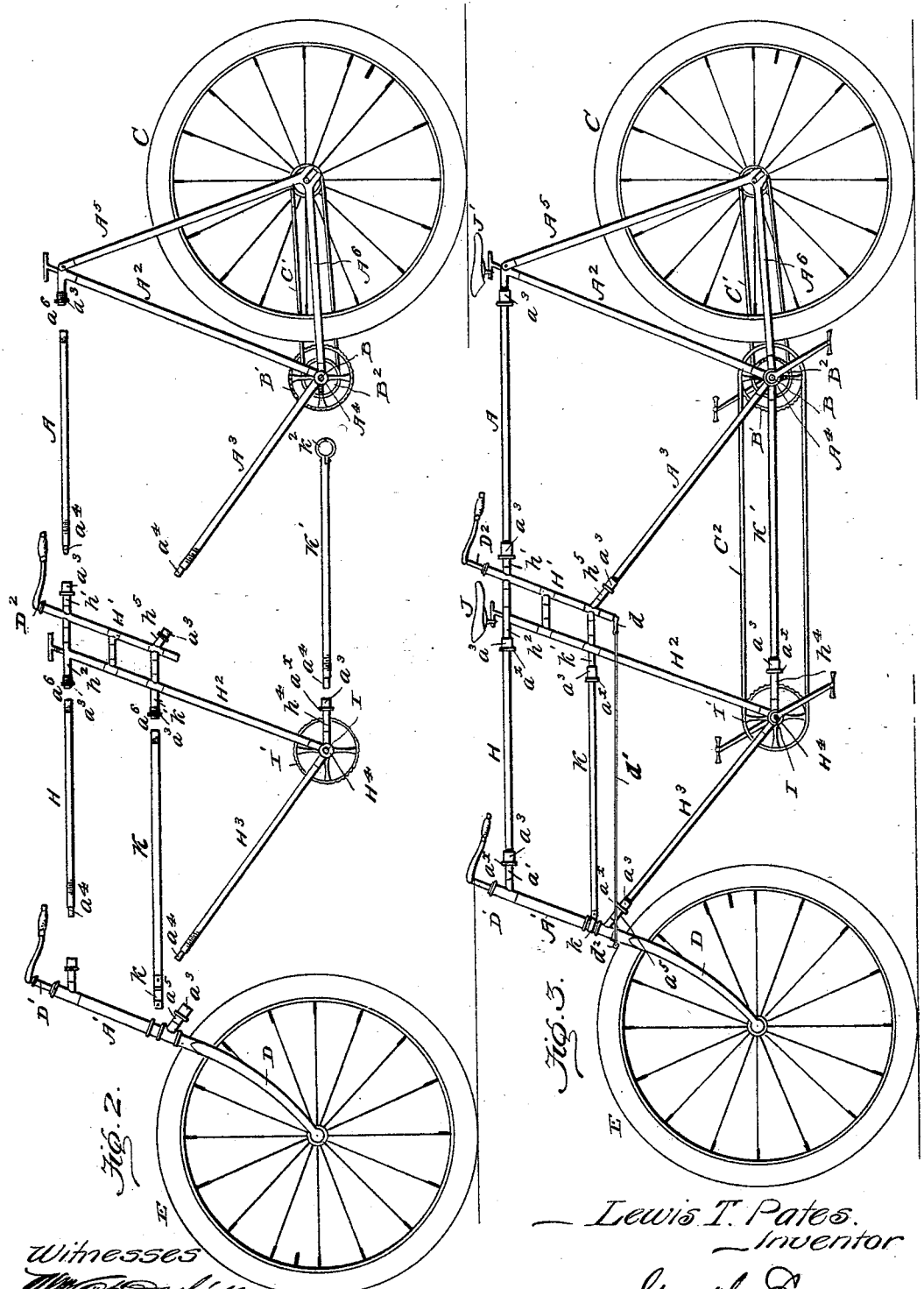

(No Model.) 4 Sheets—Sheet 3.
L. T. PATES.
CONVERTIBLE BICYCLE.
No. 582,678. Patented May 18, 1897.
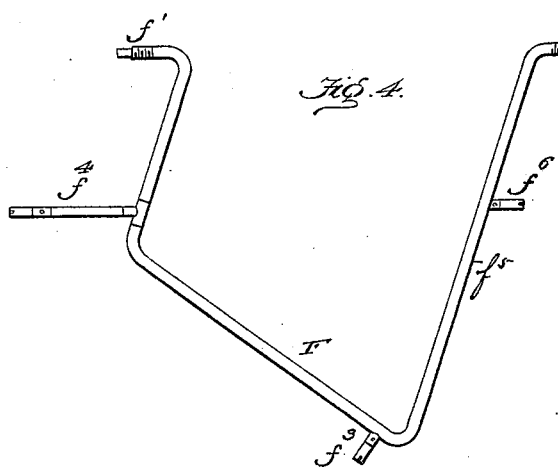
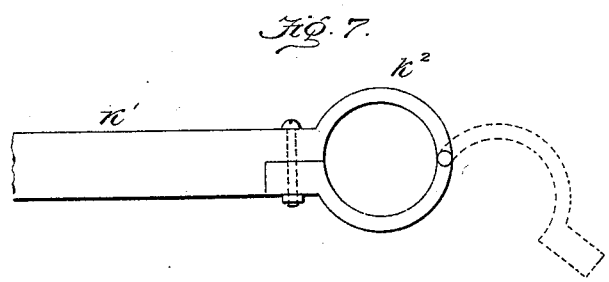
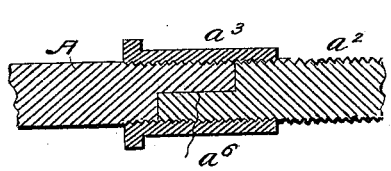
Witnesses:
Lewis T. Pates,
Inventor
By Geo. H. Evans
Atty's.

(No Model.) 4 Sheets—Sheet 4.
L. T. PATES.
CONVERTIBLE BICYCLE.
No. 582,678. Patented May 18, 1897.
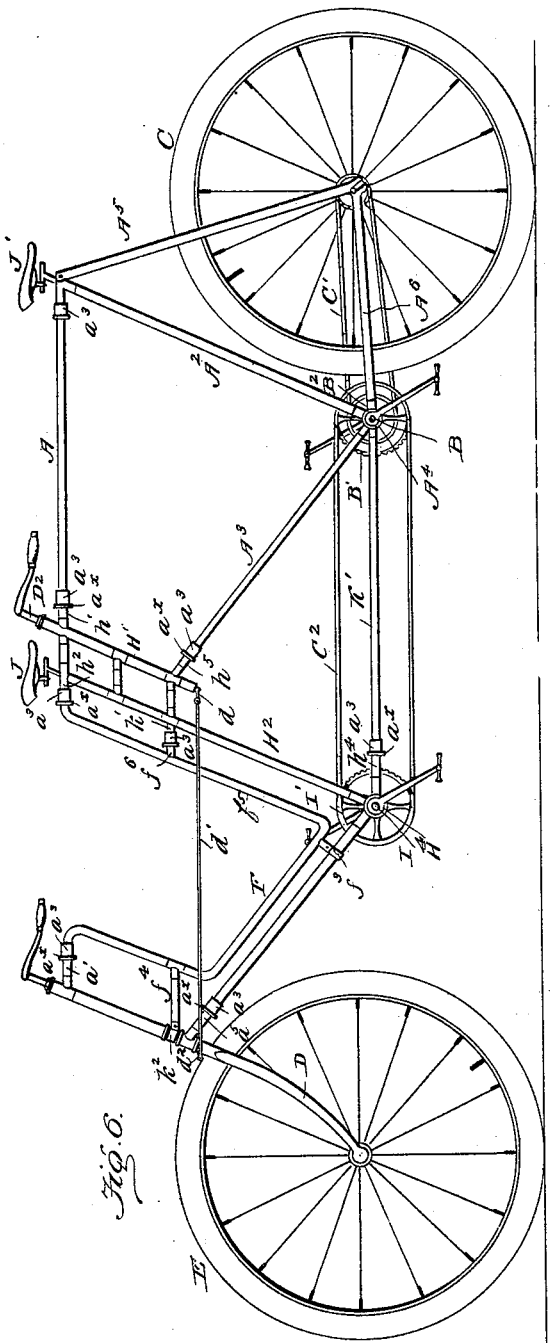
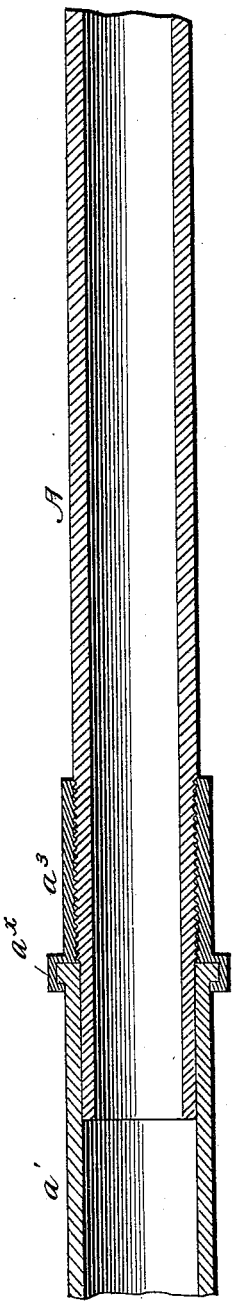
Witnesses:
Lewis T. Pates, Inventor
by Geo. H. Evans
Att'ys.

UNITED STATES PATENT OFFICE.

LEWIS T. PATES, OF ALTON, ILLINOIS, ASSIGNOR OF ONE-HALF TO WILLIAM JOESTING, OF SAME PLACE.

CONVERTIBLE BICYCLE.

SPECIFICATION forming part of Letters Patent No. 582,678, dated May 18, 1897.

Application filed July 3, 1896. Serial No. 598,009. (No model.)

*To all whom it may concern:*

Be it known that I, LEWIS T. PATES, a citizen of the United States, residing at Alton, Madison county, Illinois, have invented certain new and useful Improvements in Convertible Bicycles, of which the following specification contains a full, clear, and exact description, reference being had to the accompanying drawings, forming a part thereof, in which—

Figure 1:
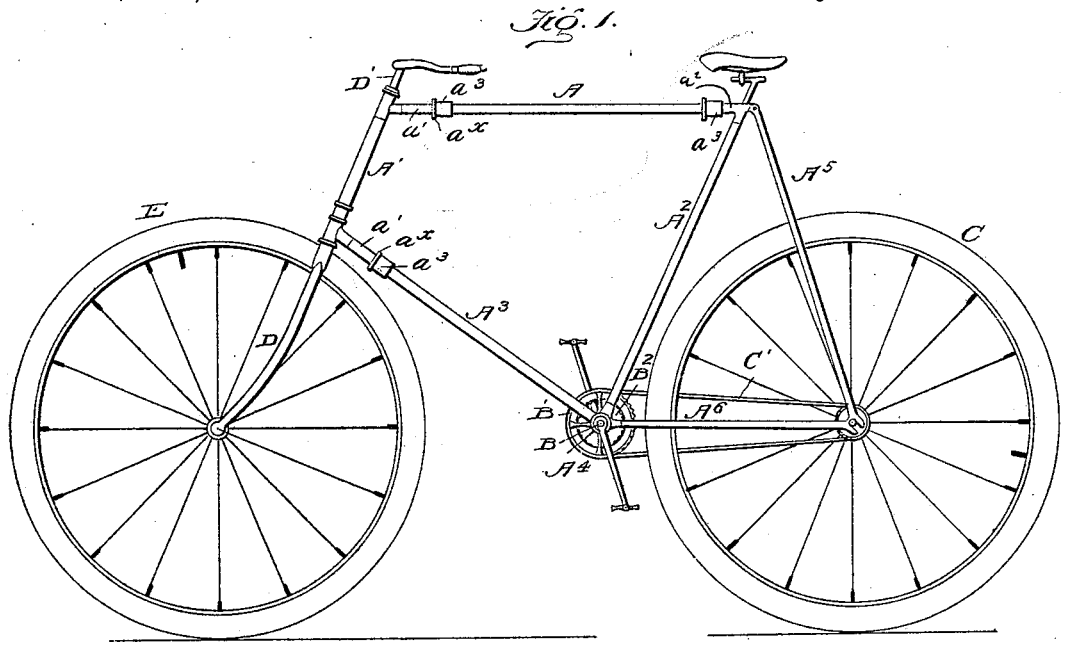
Figure 5:
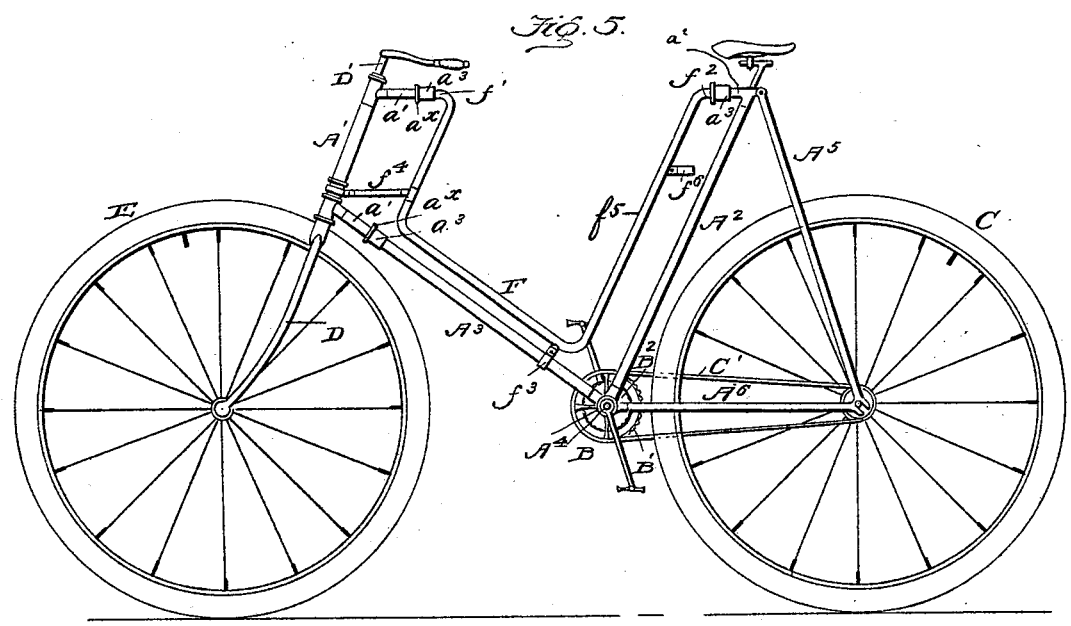

Figure 1 is a side elevation of my improved bicycle when adjusted to form a single diamond-frame safety. Fig. 2 shows the bicycle in side elevation with its parts disconnected and ready for adjustment as a tandem for men. Fig. 3 is a view similar to Fig. 2, but with the parts all connected and forming a tandem for men. Fig. 4 is a side elevation of a drop-bar to replace the top frame-bar in Fig. 1 to convert same into a lady's drop-frame, or to replace the forward or rear top bar in the tandem shown in Figs. 2 and 3. Fig. 5 is a side elevation of the machine converted into a lady's drop-frame for a single rider. Fig. 6 shows the tandem converted by said drop-bar into a machine for a man and a woman. Fig. 7 is a detail showing the clamp on one of the brace bars or tubes. Fig. 8 is a detail of one of the frame and branch bars and the union or coupling therefor. Fig. 9 shows a portion of a frame-bar and the coupling at the end thereof opposite that in Fig. 8.

My invention relates to convertible safety-bicycles of the rigid diamond-frame type.

The objects are to provide a bicycle which may be used by a single rider and converted from a diamond frame to a drop-frame; also, to provide an intermediate attachment by which, upon the separation of the top and bottom bars of the frame, the machine may be converted into a tandem for men or women, or for one man and one woman, and these objects to be accomplished without removing either wheel from its fork, and, finally, to effectually brace the machine by supplemental brace-bars when converted into either form of tandem and rigidly couple the parts in whatever form the machine may be converted, so as to render the frame perfectly rigid.

The invention will now be fully described, and particularly set forth in the claims.

Referring to Fig. 1, the machine presents the appearance of an ordinary "diamond-frame safety," but differs mechanically therefrom in having the top bar A separably coupled at its front end to the upper end of the tubular front bar or steering-head A', and at its rear end separably coupled to the upper end of the seat-supporting bar $A^2$, while the lower inclined bar $A^3$ is separably coupled at its upper forward end to the lower end of the steering-head or bar A', and is permanently connected at its rear lower end to the lower end of the bar $A^2$ in the usual manner by means of the hanger $A^4$, which supports the pedal-crank axle B, which axle has the auxiliary sprocket B' and the usual sprocket $B^2$. The sprocket $B^2$ is connected to the sprocket of the rear driving-wheel C by the ordinary chain C'. The rear bars $A^5$ $A^6$ of the frame are constructed as usual.

D is the front fork, carrying the front wheel E, and D' is the steering-post, having any preferred form of handle-bar.

The removable tubular top bar A is rigidly but separably connected at its front externally-threaded end to the head A' by means of a short tubular branch bar $a'$, projecting rearwardly from the head and carrying an internally-threaded coupling-sleeve or union $a^3$, having a polygonal wrench-engaging head $a^\times$. The end of the branch bar $a'$ has an annular shoulder which engages the interior of head $a^\times$, and thus prevents the sleeve or union $a^3$ from slipping off said branch. The bar A terminates at this end in a tenon or extension $a^4$, which is drawn tightly into the branch $a'$ when the coupling $a^3$ is properly turned by a wrench applied to its head $a^4$. The rear end of the bar A is threaded and rabbeted and is coupled to a threaded rabbeted branch $a^2$, projecting forwardly from the rear bar $A^2$, by means of a coupling $a^3$, mounted on branch $a^2$, as above described with regard to branch $a'$. Thus when the said rabbeted ends are in register the lap-joint $a^6$ (shown in Fig. 9) will be formed and the coupling will rigidly lock the same together. This lap-joint $a^6$ allows of the removal of bar A without disturbing any other parts of the machine, as it is only necessary to unscrew both sleeves $a^3$, move the rabbeted end $a^6$ outward, and then pull the bar A rearwardly to disengage its tenon or extension $a^4$ from branch $a'$. When the bar is thus removed, the drop-bar F (see Fig. 4) may be inserted in lieu thereof, as its ends have oppositely-extending branches $f'$ $f^2$, which are formed to correspond with the ends $a^4$ $a^6$ of bar A, and therefore will readily fit the branches $a'$ $a^2$, to which they may be firmly secured by the sleeves or unions $a^3$. The drop-bar F also has braces $f^3 f^4$, terminating in clamps adapted to be clamped to the bar $A^3$ and the steering-head A', respectively, as clearly shown in Fig. 5.

In order to convert the single wheel, Fig. 1, into a tandem, as shown in Fig. 3, I provide an auxiliary tandem-forming frame consisting in the bars H $H^2$ $H^3$, the two latter bars being connected by the crank-hanger $H^4$, carrying the auxiliary pedal-crank axle I. The front auxiliary seat J is carried by the bar $H^2$ just as the main seat J' is carried by the bar $A^2$. The bars H $H^2$ $H^3$ correspond in position, &c., to the bars A $A^2$ $A^3$, so that when the bars A $A^3$ are disconnected from the bar A' the front ends of the bars H $H^3$ will register with the branch arms $a'$ $a^5$ on steering-head A', so as to be coupled thereto by the sleeves or unions $a^3$. The rear side of the bar $H^2$ at its upper end is provided with the auxiliary steering-head H', from the rear side of which project two branch arms $h'$ $h^5$, which correspond exactly with the branches $a'$ $a^5$ on head A', so that the main bars A $A^3$ may be coupled at their forward ends thereto by the unions $a^3$. The head H' carries a steering-post $D^2$, provided with a suitable handle-bar at its upper end, operatively connected at its lower end with the front steering-fork D, a simple connection being the cranks $d$ $d$ at lower end of post $D^2$ and connecting-rods $d'$, leading therefrom to the cranks $d^2$, removably clamped to fork D. (See Fig. 3.) The crank-axle I has a sprocket-wheel I', connected with the sprocket B' by a chain $C^2$.

The tandem-frame of Fig. 3 is braced between the bars H $H^3$ by a longitudinal brace-bar K, provided at its front end with a clamp $k$, such as shown in Fig. 7, which embraces the steering-head A', adjacent to the lower end thereof, while the rear end of said brace-bar is coupled to the bar $H^2$ by means of the union $a^3$ and a branch arm $k'$.

K' is a rear lower brace-bar, having a clamp $K^2$ at its rear end which embraces the rear hanger $A^4$, the construction of the clamp being shown in Fig. 7. The front end of the brace-rod K' is coupled to the lower end of bar $H^2$ by means of a branch arm $h^4$, extending rearwardly from the hanger $H^4$, and the coupling $a^3$. When the parts are all properly coupled, as shown in Fig. 3, a perfectly strong rigid frame will be formed.

By uncoupling the top bar H at $a'$ $h^2$ and removing it, together with brace-rod K, and inserting the drop-bar F the drop-frame tandem of Fig. 6 will be produced. It will be understood, however, that the auxiliary frame may be made in two styles, (shown in Figs. 3 and 5,) as either form of frame will fit the single machine of Fig. 1 when its frame is separated, as in Fig. 2. In Fig. 6 it will be seen that the rear arm $f^5$ of the drop-bar F is separably coupled between its ends to the branch $k'$ on bar $H^2$ by means of a registering branch $f^6$ and coupling-sleeve $a^3$. Where the woman is to occupy the rear seat of the tandem, the bar A, Fig. 3, will be removed instead of bar H and the drop-bar inserted.

I am aware that it is not new to provide an auxiliary frame carrying a seat, driving-axle, and steering-head and adapted to be coupled to the main steering-head and front end of the main frame upon the separation of said front end from the main steering-head, and I do not claim the same, broadly, as of my invention.

It will be understood that my invention is not to be restricted to the particular couplings or unions connecting the several removable parts.

What I claim is—

1. The combination with a diamond-frame safety-bicycle having a straight removable top bar separably coupled at its ends to the steering-head and seat-bar respectively, of a separate and independent drop-bar interchangeable with said top bar, and comprising front, rear and bottom members parallel with the corresponding members A', $A^2$, $A^3$ of the frame, the upper ends of the front and rear members projecting toward the steering-head and seat-bar respectively, for coupling therewith at the same places as the straight top bar, and one or more braces on the drop-frame having means for coupling to the frame, substantially as described.

2. The combination with the diamond-frame safety-bicycle having short branches $a'$, $a^2$, projecting toward each other from the upper ends of the steering-head A' and seat-bar $A^2$ respectively, a straight removable top bar registering at its ends with said branches, and threaded coupling-sleeves uniting the bar and branches, of a drop-bar interchangeable with said top bar and comprising three members corresponding to the three members A', $A^2$, $A^3$, of the frame and braces on the drop-bar provided with couplings for connecting it to the frame members A', $A^3$; the upper extremities of the drop-bar being projected oppositely to register with the branches $a'$, $a^2$, and be coupled thereto when the top bar is removed, substantially as described.

3. The combination, with a diamond-frame safety-bicycle, the top and bottom bars of which are separably and separately coupled at their forward ends to branch bars or extensions projecting rearwardly from the upper and lower ends of the steering-head, of a tandem-forming frame having frame-bars at its front side to register at their front ends with and be coupled to said steering-head branch bars or extensions, a steering-head on the rear side of the upper end of the auxiliary frame and having rearwardly-projecting branch bars or extensions corresponding to those on the main steering-head to couple to the front ends of the upper and lower bars of the main frame; the auxiliary frame also having a seat, and driving-gear connected to the main driving-gear, substantially as set forth.

4. The combination, with the diamond-frame bicycle having its upper and lower bars separately and separably coupled to the branches or extensions projecting rearwardly from the main steering-head, of the auxiliary tandem-forming frame having the front end of its upper and lower bars constructed to couple with the branches or extensions on the main steering-head and having an auxiliary seat and steering-head in rear thereof and provided with rearwardly-projecting branches or extensions to couple with the front ends of the upper and lower bars of the main frame, and the removable brace-bars connecting the auxiliary frame with the front and rear sections of the main frame, one of said brace-bars extending from the auxiliary frame to the main steering-head and the other extending from the lower end of the auxiliary frame to the lower end of the rear section of the main frame, substantially as set forth.

5. A convertible diamond-frame bicycle, comprising the front steering-head having rearwardly-projecting branches or extensions $a'$, $a^5$, the upper and lower bars A, $A^3$ being separably and separately coupled at their forward ends to said branches $a'$, $a^5$, and the auxiliary or tandem-forming frame having bars H, $H^2$, $H^3$, corresponding to the bars A, $A^2$, $A^3$, of the main frame and also having a steering-head H', provided with branches $h'$, $h^5$, corresponding to the branches $a'$, $a^5$; the bars $A^2$, $A^3$, and $H^2$, $H^3$, being permanently connected by their pedal-crank hangers $A^4$, $H^4$, and the upper bars A, H, being separably coupled at both ends to the bars $A^2$, H' and $H^2$, A', respectively, to permit of the introduction of one or more drop-bars, substantially as set forth.

6. The auxiliary tandem-forming frame, for insertion in a diamond-frame bicycle, the same comprising the bar $H^2$ provided with the steering-head H' having rearwardly-extending coupling branches $h'$, $h^5$, the seat at upper end of bar $H^2$, the hanger at lower end of said bar and carrying a pedal-crank axle and its sprocket-wheel, and the lower bar $H^3$ inclined upwardly and forwardly from the said hanger and the upper or top bar connected at its rear end with the upper end of bar $H^2$; the forward ends of the upper and lower bars being fitted for rigid, separable coupling with the main tubular steering-head and the branches $h'$, $h^5$, being fitted for rigid, separable coupling with the forward ends of the upper and lower bars of the main frame of a bicycle of the character described, substantially as set forth.

7. The auxiliary tandem-forming frame, for insertion in a diamond-frame bicycle, the same comprising the bar $H^2$, provided with the steering-head H', having rearwardly-extending coupling branches $h'$, $h^5$, the seat at upper end of said bar $H^2$, the hanger at lower end of said bar and carrying a pedal-crank axle and its sprocket-wheel, the longitudinal brace-rod extending rearwardly from said hanger and having a clamp at its rear end to engage the hanger of the main frame, the lower bar $H^3$, extending upwardly and forwardly from the auxiliary hanger, the upper or top bar connected at its rear end with bar $H^2$, an upper forward brace-rod connected at its rear to the auxiliary frame and having a clamp at its front end to engage the main steering-head; the forward ends of the upper and lower bars of the auxiliary frame being fitted for rigid, separable coupling with the main tubular steering-head, and the branches $h'$, $h^2$, being fitted for rigid, separable coupling with the forward ends of the upper and lower bars of the main frame of a bicycle of the character described, substantially as set forth.

8. The auxiliary tandem-forming drop-frame, for insertion in a diamond-frame bicycle, the same comprising the bar $H^2$, provided with the steering-head H', having rearwardly-extending coupling branches $h'$, $h^5$, the seat at upper end of said bar $H^2$, the hanger at the lower end of said bar, a pedal-crank axle mounted in the said hanger and provided with a sprocket-wheel, the brace branch $h^4$, extending rearwardly from said hanger, and the lower bar $H^3$ extending upwardly and forwardly from said hanger, and the drop-bar F, secured at its rear end to the bar $H^2$, braced to bar $H^3$, and having an upper forwardly-projecting brace-bar $f^4$, having a clamp at its front end to engage the main steering-head; the forward ends of the bars $H^3$ F, being fitted for separate coupling to main steering-head of a diamond-frame bicycle and the branches $h'$, $h^5$, being fitted for similar coupling to the forward ends of the upper and lower bars of main frame of a bicycle of the character described.

9. The interchangeable drop-bar F, for single or tandem bicycles of the character described, comprising the parallel front and rear arms and an inclined lower connecting member; the upper ends of the front and rear arms being respectively provided with the forwardly and rearwardly projecting threaded ends $f'$, $f^2$, the brace $f^3$ on said inclined lower member having a clamp at its lower end to engage the lower frame-bar, and the upper, forwardly-extending brace-bar $f^4$, on said front bar and having a clamp at its forward end to engage the steering-head, substantially as described.

10. The rigid diamond frame, having a branch arm $a'$, extending rearwardly from its head $A'$, and a branch arm $a^2$, extending forwardly from its seat-supporting bar $A^2$, and provided with a rabbeted or reduced end, a removable top bar in the longitudinal plane of the arms $a'$, $a^2$, and having a tenon at its front end entering the arm $a'$, and provided with a rabbeted or reduced rear end registering with the similarly-constructed end of the arm $a^2$, to form a lap-joint, and the coupling-sleeves $a^3$ $a^3$; whereby the top bar may be removed without disconnecting the bottom bar, substantially as described.

11. The combination with a rigid diamond-frame safety-bicycle, the top and bottom bars of which are separably and separately coupled to the tubular steering-head, of an auxiliary insertible and removable tandem-forming frame having a seat-supporting bar provided with forwardly-projecting bars corresponding in position to the top and bottom bars of the main frame and couplings for uniting them rigidly the main steering-head, an auxiliary steering-head on the upper end of the auxiliary seat-carrying bar, couplings for separably and rigidly uniting the front ends of the top and bottom bars of the main frame to the said auxiliary steering-head, an auxiliary pedal-crank axle and sprocket carried by the lower end of the auxiliary frame, and a chain for connecting said sprocket with the sprocket on the main pedal-axle, substantially as set forth.

LEWIS T. PATES.

Witnesses:
 ERNEST F. SCHRIMPF,
 CHAS. L. GOULDING.